United States Patent [19]

Kokubo et al.

[11] Patent Number: 4,564,140

[45] Date of Patent: Jan. 14, 1986

[54] STACKER SUPPORTING DEVICE IN AUTOMATIC MONEY DEPOSITING AND DISBURSING MACHINE

[75] Inventors: Eiichi Kokubo; Junichi Arikawa; Kowichi Goi; Shinichi Imura, all of Tokyo, Japan

[73] Assignee: Laurel Bank Machine Co., Ltd., Tokyo, Japan

[21] Appl. No.: 406,169

[22] Filed: Aug. 9, 1982

[30] Foreign Application Priority Data

Sep. 2, 1981 [JP] Japan ............................... 56-137973

[51] Int. Cl.4 ............................................. B65G 11/04

[52] U.S. Cl. .......................... 232/57.5; 194/DIG. 26

[58] Field of Search ............................ 232/57.7, 57.5; 194/DIG. 9, DIG. 26

[56] References Cited

U.S. PATENT DOCUMENTS 3,158,159 11/1964 Weber ............................... 232/57.5

FOREIGN PATENT DOCUMENTS 56-33757 4/1981 Japan .

*Primary Examiner*—Gene Mancene
*Assistant Examiner*—James Hakomaki
*Attorney, Agent, or Firm*—Fleit, Jacobson, Cohn & Price

[57] ABSTRACT

An automatic money depositing and disbursing machine has functions of receiving bank notes from a transacting port and feeding the same through a discriminating section provided in a note circulating delivery passage and accommodating in boxes normal notes judges by the discriminating section, and of disbursing the notes through the discriminating section from the transacting port. The machine is of such a construction that at least portions of the received notes are used as notes to be defrayed or disbursed. The boxes are adapted to be removably supported on the stacker supporting device. The stacker supporting device comprises a rail portion attached to the bottom of the machine and a movable portion adapted to accommodate the boxes therein and slidably supported on the rail portion in horizontal opposite directions.

3 Claims, 23 Drawing Figures

(A)

(B)

(A)

STACKER SUPPORTING DEVICE IN AUTOMATIC MONEY DEPOSITING AND DISBURSING MACHINE

BACKGROUND OF THE INVENTION

The present invention relates to an automatic money depositing and disbursing machine in which deposited notes are circulated and utilized again as notes to be defrayed.

The conventional automatic money depositing and disbursing machine has depositing and disbursing functions independently. Namely, the conventional automatic money depositing and disbursing machine is required to have a depositing function of discriminating, one by one, received notes inserted in a receiving section receiving the notes judged as being true notes and returning the notes judged as being not true notes, and a disbursing function of temporarily storing notes to be disbursed, which are fed from a disbursing box while detecting double feeding and incorporation of different kinds of notes, disbursing the notes when a predetermined number of notes are stored without detection of any disorder, and feeding the normal notes already stored and notes judged as being abnormal notes to a reject body when a disorder is detected before a predetermined number of notes are stored and repeating the disbursing operation from the beginning.

The sections for performing the above-mentioned depositing and disbursing functions should be arranged completely independently from each other so as to avoid incorporation of deposited notes and disbursed notes. Accordingly, it is considered that depositing and disbursing units having the above functions, respectively are constructed independently and they are combined together to form an automatic money depositing and disbursing machine. However, if both the depositing and disbursing units are simply combined together, the size of the automatic money depositing and disbursing machine is increased and the structure is complicated.

In order to eliminate this disadvantage, there has been proposed a machine in which deposited notes are sorted and contained in note boxes arranged for the respective kinds of notes and the notes contained in these boxes are delivered and utilized as notes to be defrayed, for example, a circulation type money depositing and disbursing machine disclosed in Japanese Patent Application Laid-Open Specification No. 33757/81. However, circulation of deposited notes for utilizing them as notes to be defrayed has already been performed manually, and a problem how to perform circulation effectively is still kept unsolved.

In the technique disclosed in Japanese Patent Application Laid-Open Specification No. 33757/81, there is adopted a method in which received true notes are distributed into note boxes for the respective kinds from above and are accumulated therein and at the time of disbursement, the accumulated notes are delivered out one by one from the lower notes by utilizing the gravity of the notes. In this conventional technique, depositing and disbursing openings should be formed on the upper and lower portions of each note box, and the structure becomes complicated. Furthermore, in order to circulate notes, it is necessary to arrange a passage for delivering upward notes delivered out from the lower portion of the note box, and the note box should be attached and drawn out so that the note box does not intersect this delivery passage. Accordingly, the direction of attaching and drawing out the note box is limited to one direction.

According to the setting condition, automatic money depositing and disbursing machines are divided into two types, that is, the lobby type (the machine is set mainly in a lobby of a bank and note boxes are attached from the side where a customer performs the operation) and the embedded type (the machine is set mainly in an unmanned store or corner, only the portion for the operation of the customer is arranged on the machine-embedded wall and note boxes are attached from a different room on the inner side of the wall). If the direction of attaching and drawing out the note boxes is limited to one direction, the automatic money deposing and disbursing machine can be used for only the lobby type or the embedded type. Therefore, automatic money depositing and disbursing machines of both the types should be independently arranged for the respective uses exclusively, resulting in increases of the costs. Moreover, the adaptability to changes of setting conditions are very poor.

SUMMARY OF THE INVENTION

It is, therefore, an object of the invention to provide an automatic money depositing and disbursing machine in which a note transfer mechanism for feeding notes into boxes from above and containing the notes therein and also for delivering upward the notes contained in the boxes and feeding the notes into a note circulating delivery passage is arranged below the note circulating delivery passage for circulating deposited notes and utilizing them as notes to be defrayed, and a plurality of boxes are arranged so that the boxes are connected only at the upper portion thereof to the note transfer mechanism and the boxes can be drawn out at least in opposite directions.

In accordance with the present invention there is provided an automatic money depositing and disbursing machine wherein notes thrown into a transacting port are fed into a discriminating section to detect the presence or absence of abnormal notes and receive normal notes and at least portion of the received notes as used as notes to be defrayed, which comprises, a note circulating delivery passage for delivering received notes and notes to be defrayed through a common note, a note transfer mechanism disposed below said note circulating delivery passage and a stacker supporting device disposed below said note transfer mechanism and supporting a plurality of boxes for containing the notes wherein, said note transfer mechanism being adapted to receive the notes from the note circulating delivery passage, and to suck the notes from the boxes supported on the stacker supporting device so as to transfer the notes to the note circulating delivery passage, characterized in that said stacker supporting device comprises a rail portion attached to the bottom of the machine and a movable portion adopted to accommodate the boxes therein and slidably supported on the rail portion in horizontal opposite directions to be removed from the machine and to be inserted into the machine in either direction.

DESCRIPTION OF THE DRAWINGS

The present invention will now be described in detail by reference to embodiments illustrated in the accompanying drawings in which.

DESCRIPTION OF THE PREFERRED EMBODIMENTS

The present invention will now be described in detail with reference to the accompanying drawings.

Figure 1:
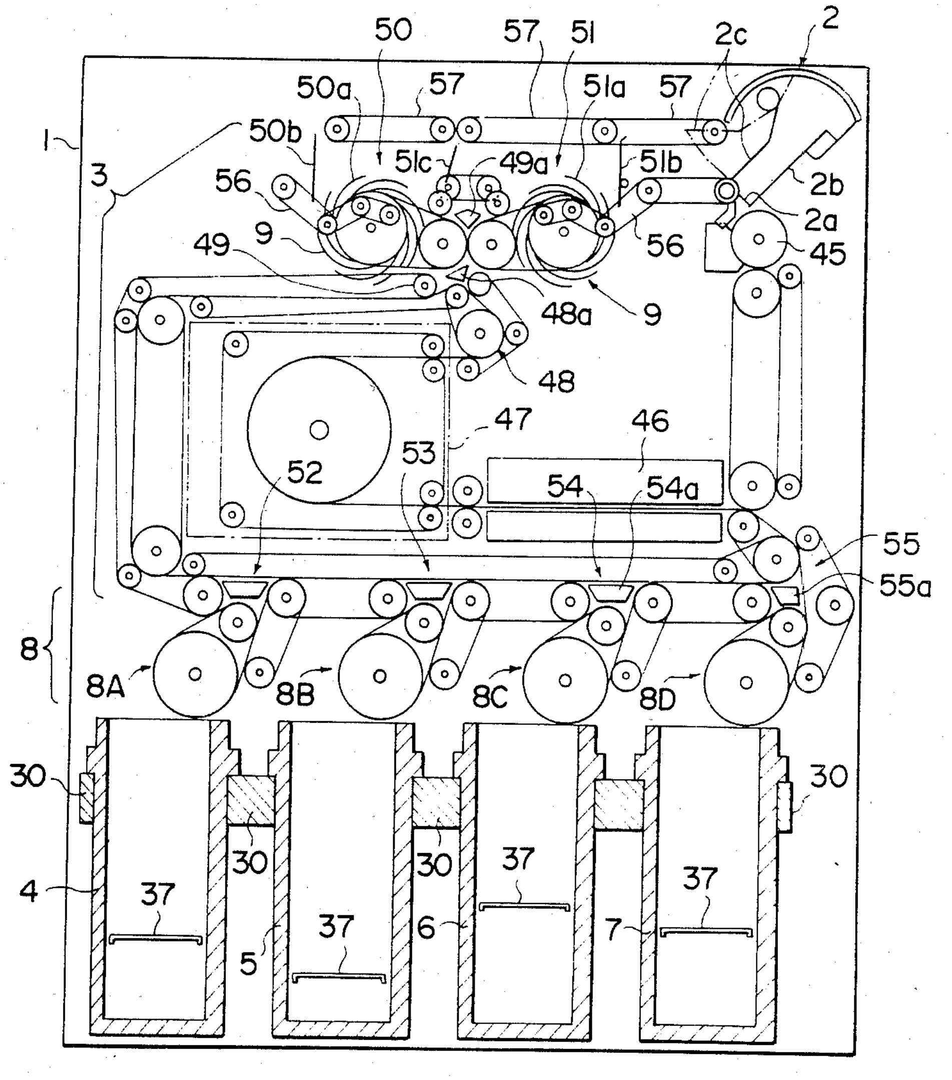
FIG. 1 is a diagrammatical side view showing a whole structure of one embodiment of an automatic money depositing and disbursing machine according to the present invention.
Figure 2:
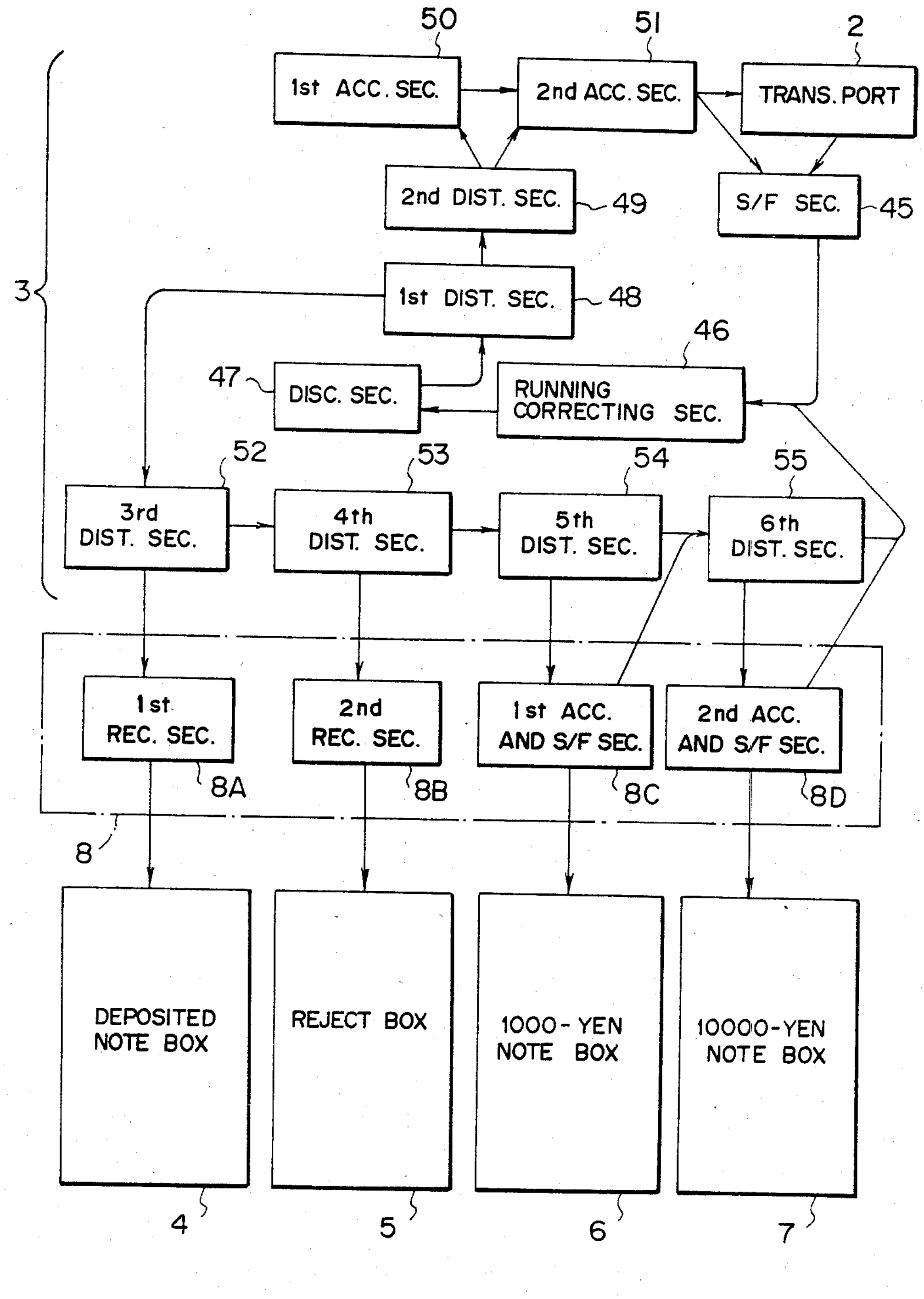
FIG. 2 is a block diagram showing the flow of notes circulated through respective sections shown in FIG. 1, FIGS. 3A and 3B are side views showing a structure of a note transfer mechanism of the automatic money depositing and disbursing machine.

FIG. 1 is a diagrammatical side view showing a whole structure of one embodiment of the automatic money depositing and disbursing machine to which the present invention is applied, and FIG. 2 is a block diagram showing a system of flow of notes through respective structural elements.

In the automatic money depositing and disbursing machine of this embodiment, operations of charging notes to be deposited and receiving notes to be disbursed are performed by customers through a transacting port 2 arranged on one side of a machine body 1 (transacting ports may be arranged on both the sides of the machine body), and while these notes are circulated and delivered through a note circulating delivery passage 3, note boxes 4 through 7 located in the lower portion of the machine body 1 are mutually connected to the transacting port 2 through the note circulating delivery passage 3.

Various means are disposed in the machine to exert the respective functions described above. In this embodiment, the note boxes 4 through 7 are connected to the note circulating delivery passage 3 through a note transfer mechanism 8 arranged above the note boxes 4 through 7. This note transfer mechanism 8 is divided, as shown in FIG. 2, into a first receiving section 8A, a second receiving section 8B, a first accumulating and separating feed section 8C and a second accumulating and separating feed section 8D so that the boxes 4 through 7 are connected to the note circulating delivery passage 3 independently. A accumulating wheels 9 are arranged to receive notes from the note circulating delivery passage 3 and let them fall down into the boxes 4 through 7, respectively. The accumulating wheel 9 has such a structure that it can be retreated upward if necessary.

The note transfer mechanism 8 will now be described with reference to FIGS. 3 and 4. A frame-like accumulating wheel holding member 11 is integrally attached to an accumulating wheel oscillating shaft 10 which is rotated reciprocatively by a driving source arranged in the machine body 1, three accumulating wheel guides 12 are rotatably supported on the accumulating wheel holding member 11 and the inner circumferential face 9*a* of the accumulating wheel 9 is brought in contact with the guides 12 so that the accumulating wheel 9 is supported. A part of the inner circumferential face 9*a* of the accumulating wheel 9 is formed into an internal gear 9*b* projecting inward. A rotating force is given to this internal gear 9*b* from a gear driving shaft 13 which is coaxial with the accumulating wheel oscillating shaft 10 and is rotatable relative to the accumulating wheel holding member 11, through gears 14A, 14B and 14C. An elongated opening 11*a* is formed on the accumulating wheel holding member 11 to extend along the oscillation direction thereof and a rotary shaft 15 intersecting the oscillation plane at a right angle is inserted in this elongated opening 11*a*. Rotatable attracting drums 16 each having an attracting head 16*a* for sucking notes is integrally attached to this rotary shaft 15. In an embodiment illustrated in FIG. 4, two attracting drum 16 are arranged on both the sides of the accumulating wheel 9. Feed belts 18 are arranged on both the sides of the attracting drums 16 and are drived by pulleys 17 rotated by the rotary shaft 15 to deliver notes sucked by the attracting drums 16 to the note circulating delivery passage 3 or to guide and deliver the notes from the note circulating delivery passage 3 toward the accumulating wheel 9.

In the above-mentioned structure, if the accumulating wheel oscillating shaft 10 is rotated or swung to retract the accumulating wheel 9 upward, the initial position described hereinafter is attained.

Figures 5A, 5B:
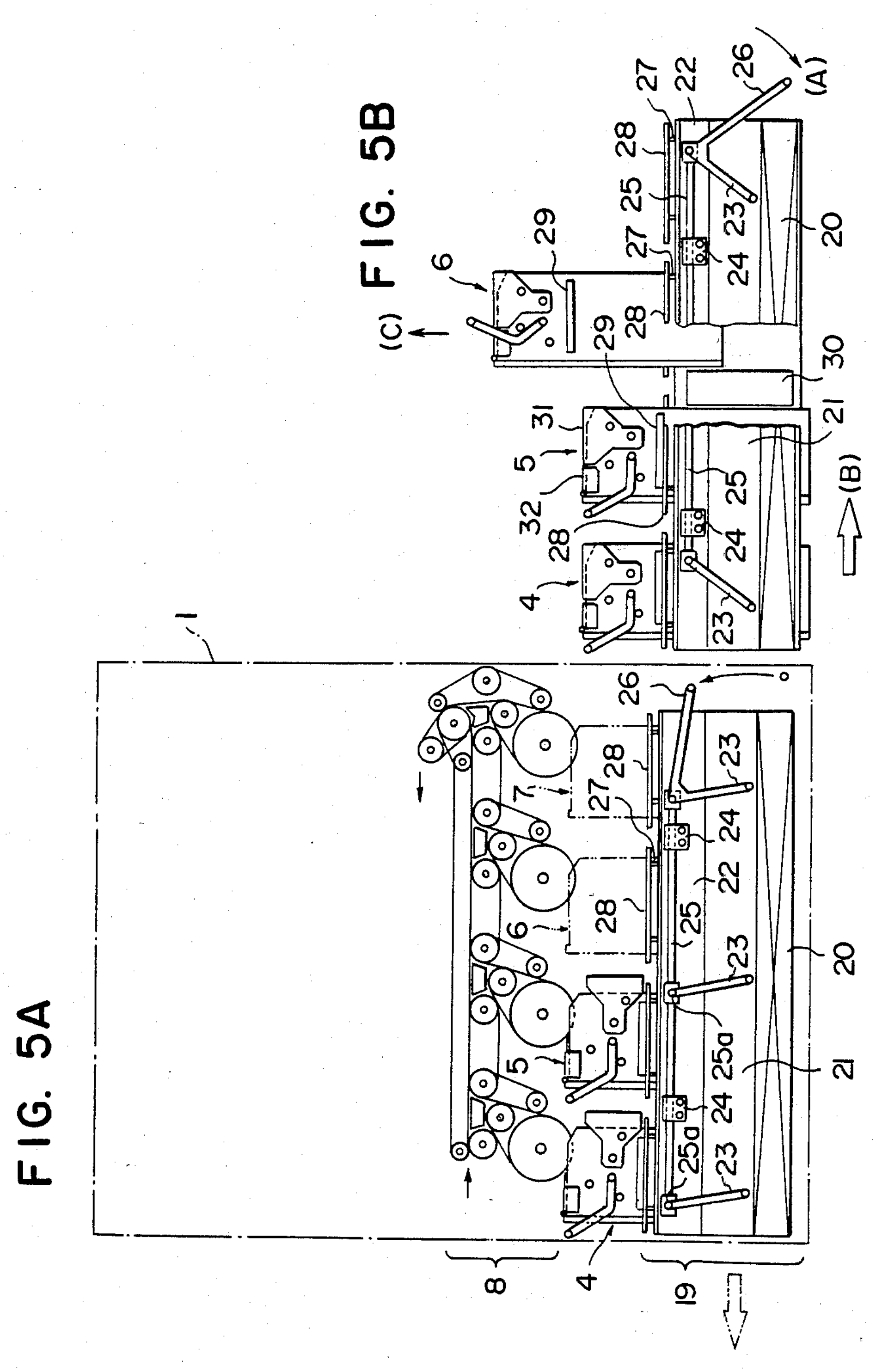

A stacker supporting device 19 shown in FIG. 5 is arranged so that the note boxes 4 through 7 can be drawn out from the machine body 1 in both the directions. This stacker supporting device 19 will now be described. Both the outer side plates 21 are supported on the machine body 1 through a slide rail 20 (for example, a sliding device proposed by the applicant in Japanese Utility Model Application No. 165295/79) so that the outer side plates 21 can be drawn out in both the directions. Both the inner side plates 22 are vertically movably inserted on the inner sides of these outer side plates 21. A plurality of arms 23 are turnably attached to each outer side plate 21, and the top ends of the arms 23 are connected through guide shaft 25 and pin 25*a* supported movably in the draw-out direction by a guide supporting member 24 integrally attached to the outer face of the inner side plate 22, whereby a parallel link mechanism is constructed. Each arm 23 is inclined slightly in the direction opposite to the draw-out direction with respect to the vertical line in the state where both the outer plates 21 are contained in the machine body 1, and a handle 26 projecting outward is integrally attached to one arm 23 located in the vicinity of the draw-out direction. These arms 23 and handles 26 are arranged on both the sides, respectively, to extend in directions opposite to each other.

Buffer plates 28 supported by spring 27 are arranged above the inner side plate 22, and the number of the buffer plates 28 corresponds to the number of the boxes 4 through 7. Projections 29 formed on the outer side faces of the boxes 4 through 7 are placed and supported on the buffer plates 28. The movement (positioning) of the boxes 4 through 7 in the draw-out direction is restricted by a positioning member 30 inserted between both the inner side plates 22.

In the above-mentioned structure, if the handle 26 is pushed down in the direction (A), the boxes 4 through 7 supported on the stacker supporting device 19 are slightly lifted up, and then, as shown in FIG. 5-B, the arms 23 are greatly inclined in the draw-out direction and brought down. Incidentally, the degree of the descending movement is determined by an appropriate stopper mounted on the inner side plate 22 or by contact of the lower end of the inner side plate 22 with the bottom of the outer side plate 21.

Figure 6:
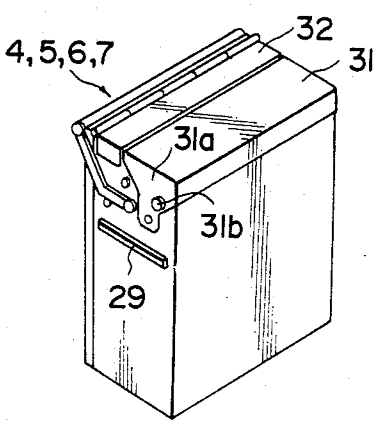
FIG. 6 is a perspective view showing one of the note boxes.
Figure 7:
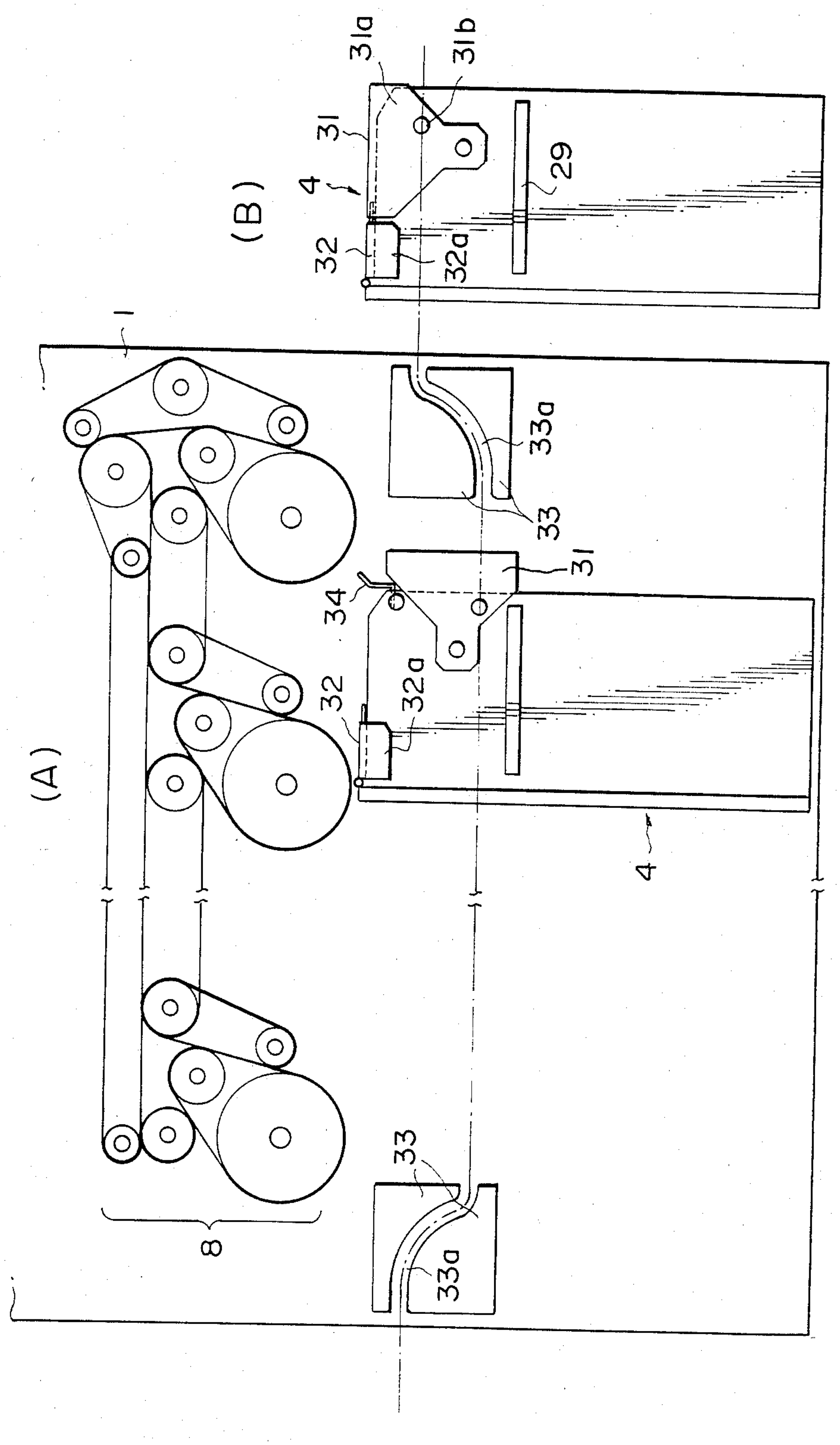
FIGS. 7A and 7B are side views showing the note boxes in FIG. 6, FIGS. 8A and 8B are views showing an internal structure of the note boxes shown in FIG. 6.

The structures of the boxes 4 through 7 will now be described. The upper opening of each of the boxes 4 through 7 is opened and closed by a rotatable front lid 31 and a pressing lid 32, as shown in FIG. 6. A guide roller 31*b* is formed on a side plate portion 31*a* of the front lid 31. When each of the boxes 4 through 7 is charged inwardly of an opening and closing cam 33 by guiding of the guide roller 31*b* to an opening and closing groove 33*a* of the opening and closing cam 33 projecting inwardly of the end portion of the machine body 1, as shown in FIG. 7-A, the front lid 31 is opened, and when each box is drawn out outwardly of the opening and closing cam 33, the front lid 31 is closed, as shown in FIG. 7-B. A stopper 34 is turnably attached to the upper portion of each of the boxes 4 through 7, and the stopper 34 is normally located at a position apart from the opening of the box by a spring as shown in FIG. 3. The stoppers 34 are connected to the driving source of the machine body 1 at the time of completion of delivery of notes and are turned, as indicated by broken lines on the left side of FIG. 3, so that they press the notes in the boxes 4 through 7, and when notes are accumulated, the stoppers are projected into the openings of the boxes to guide notes.

An operation plate 35 is slightly turnably attached to a side plate portion 32*a* of the pressing lid 32, and a friction member 35*a* for contact with accumulated notes is attached inwardly of the operating plate 35. The position of the operation plate 35 is detected by pressing force detecting sensors 36, such as micro-switches, mounted in the vicinity of the upper portion of each of the boxes 4 through 7. For example, when one sensor 36 is "on" and the other sensor 36 is "off", the normal position is indicated, when both the sensors 36 are "on", excess of the note pressing force is indicated, and when both the sensors 36 are "off", lack of the note pressing force is indicated.

Figures 8A, 8B, 8C, 8D:
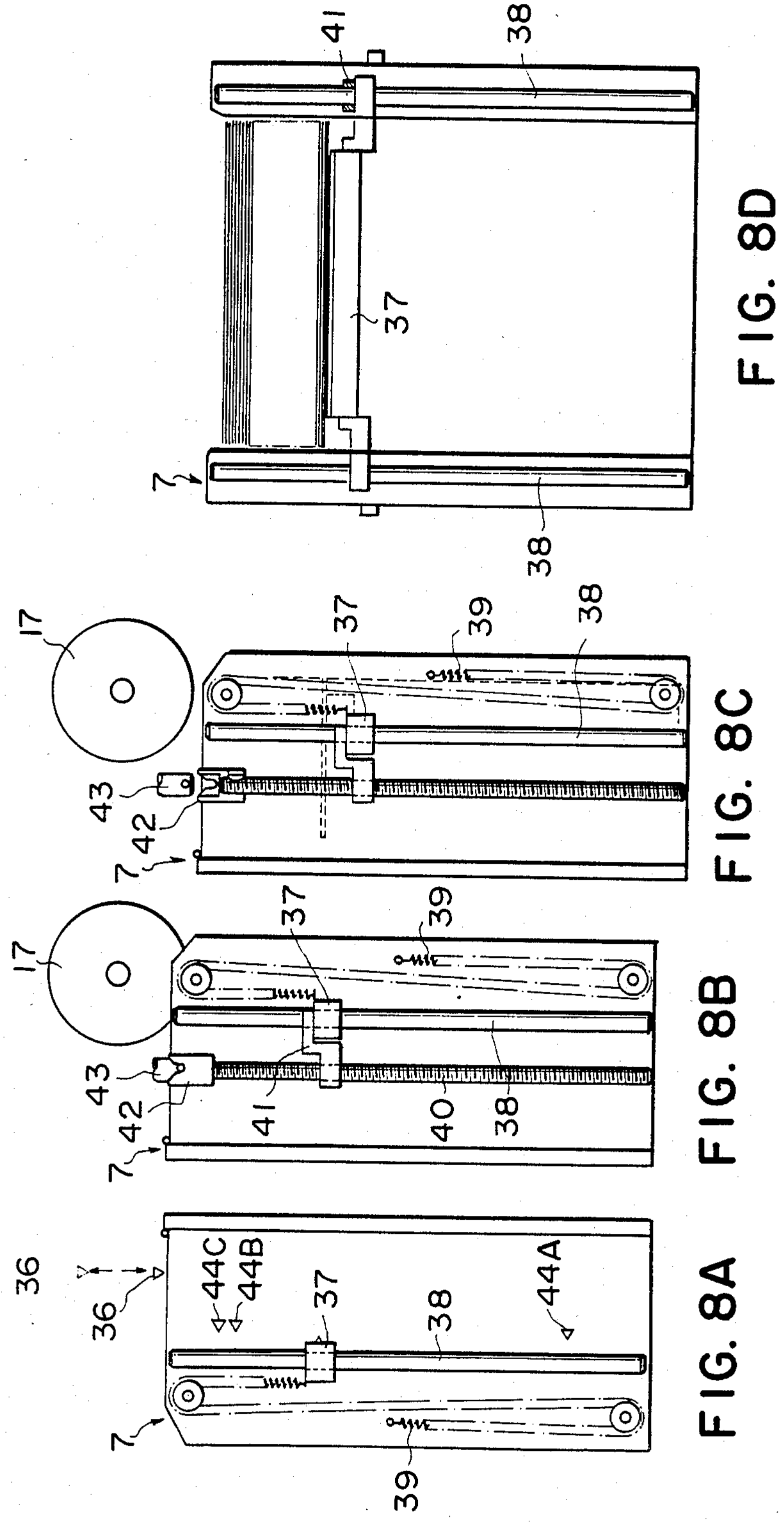

A pressing member 37 for pushing up notes is arranged in each of the boxes 4 through 7. As shown in FIG. 8, the pressing member 37 is supported vertically movably along a guide shaft 38, and the pressing member 37 is always urged upward by a spring 39 and brought into abutting contact with the lower face of an adjusting member 41 moved in the vertical direction by an adjustment screw 40, so that the upward movement of the pressing member 37 is restricted. A connecting drive shaft 43 is inserted in a joint portion 42 on the top end of the adjustment screw 41 (this insertion is accomplished by lifting up the boxes 4 through 7 in the machine body 1 by the stacker supporting device 19), so as to adjust the top face position of notes supported by the pressing member 37 and the contact pressure between the friction member 35*a* and notes. Incidentally, reference numerals 44A, 44B and 44C represent a fullness detecting sensor, a near end detecting sensor and an end detecting sensor, respectively.

The present invention will now be described with respect to items "Summary of Operation of Automatic Money Depositing and Disbursing Machine", "Depositing Treatment", "Receiving Treatment" and "Disbursing Treatment" with reference of flow charts of FIGS. 9 through 12.

SUMMARY OF OPERATION OF AUTOMATIC MONEY DEPOSITING AND DISBURSING MACHINE

Figure 9:
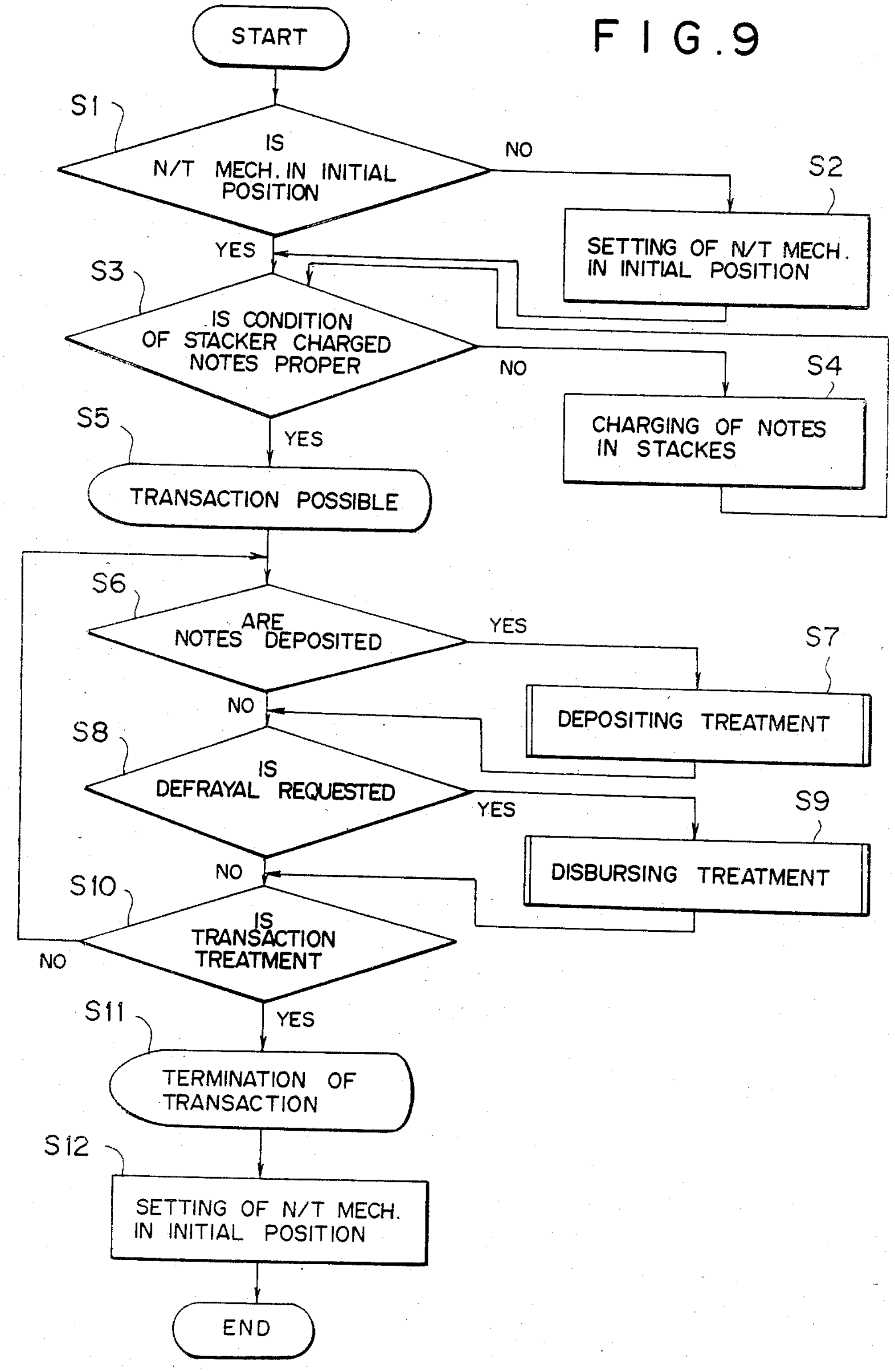
FIG. 9 is a flow chart showing steps of diagrammatical operations of the automatic money depositing and disbursing machine.

In a bank or the like, treatments are carried out along the flow shown in FIG. 9 from starting of the automatic money depositing and disbursing machine to completion of the operation thereof.

Step 1 (hereinafter abbreviated to "S1"):

Prior to starting of the automatic money depositing and disbursing machine, it is checked whether or not the note transfer mechanism 8 is located at the initial position. By the initial position is meant the state when the accumulating wheel 9 is turned upward and retreated as shown in FIG. 3-B.

S2:

In the case where the note transfer mechanism is not located at the initial position, the accumulating wheel oscillating shaft 10 is turned to turn the accumulating wheel 9 upward to the retreat position.

S3:

After setting of the initial position, the charge condition of the note boxes 4 through 7 and quantities of notes are checked by the sensors 44A, 44B and 44C.

S4:

If the result of checking at the step S3 indicates "NO" or it is desired to increase or decrease the quantity of notes, the handle 26 of the stacker supporting device 19 is brought down as indicated by arrow A in FIG. 5 to bring down the boxes 4 through 7, and the boxes 4 through 7 are drawn out from the machine body 1 as indicated by arrow B and the boxes are drawn up as indicated by arrow C according to need. The quantity of notes is adjusted and the boxes are set in the original state shown in FIG. 5-A.

S5:

The stacker supporting device 19 and boxes 4 through 7 are set at the normal positions, and transaction becomes possible that is, it becomes possible to start the operation.

S6:

Notes are deposited by a customer.

Figure 10C:
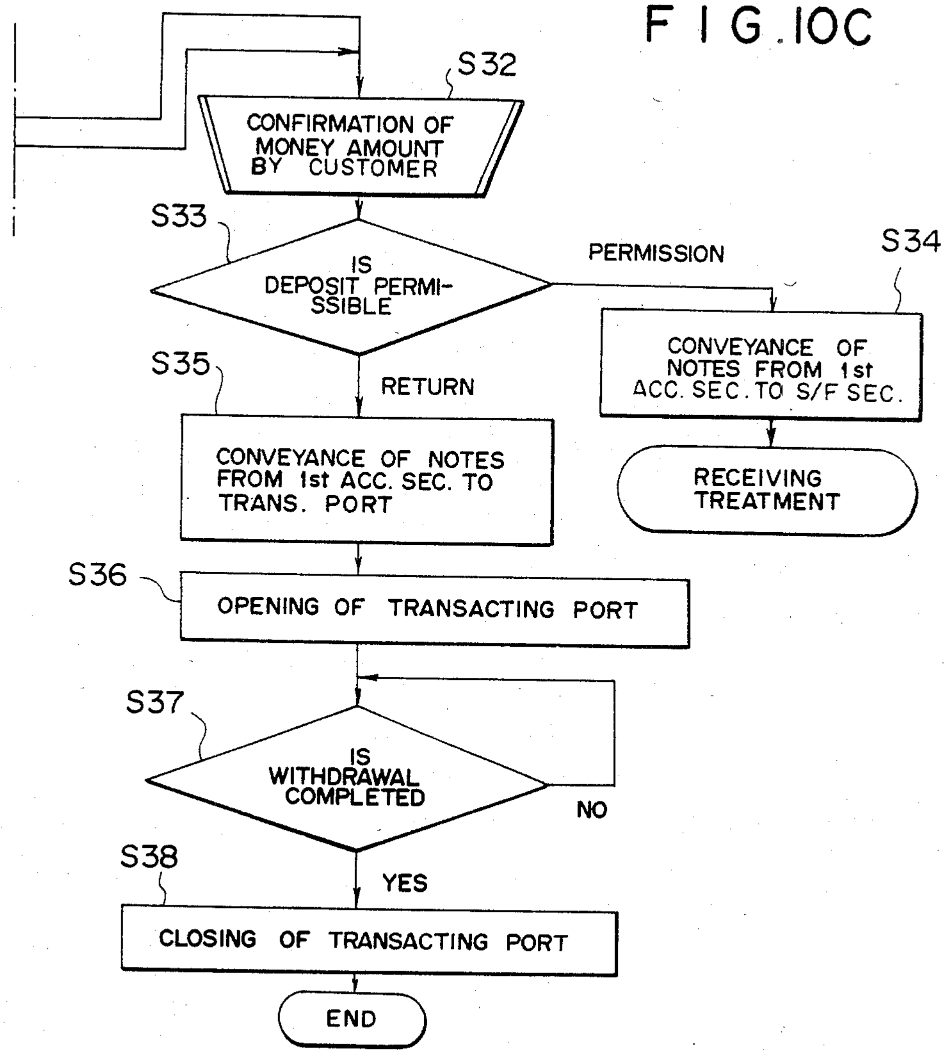
FIGS. 10 through 12 are flow charts showing steps for deposition and defrayal of notes.
Figure 10:
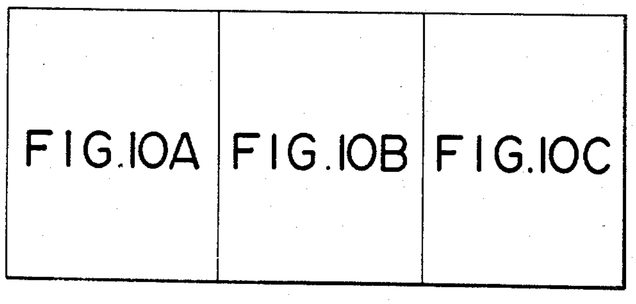
Figure 10A:
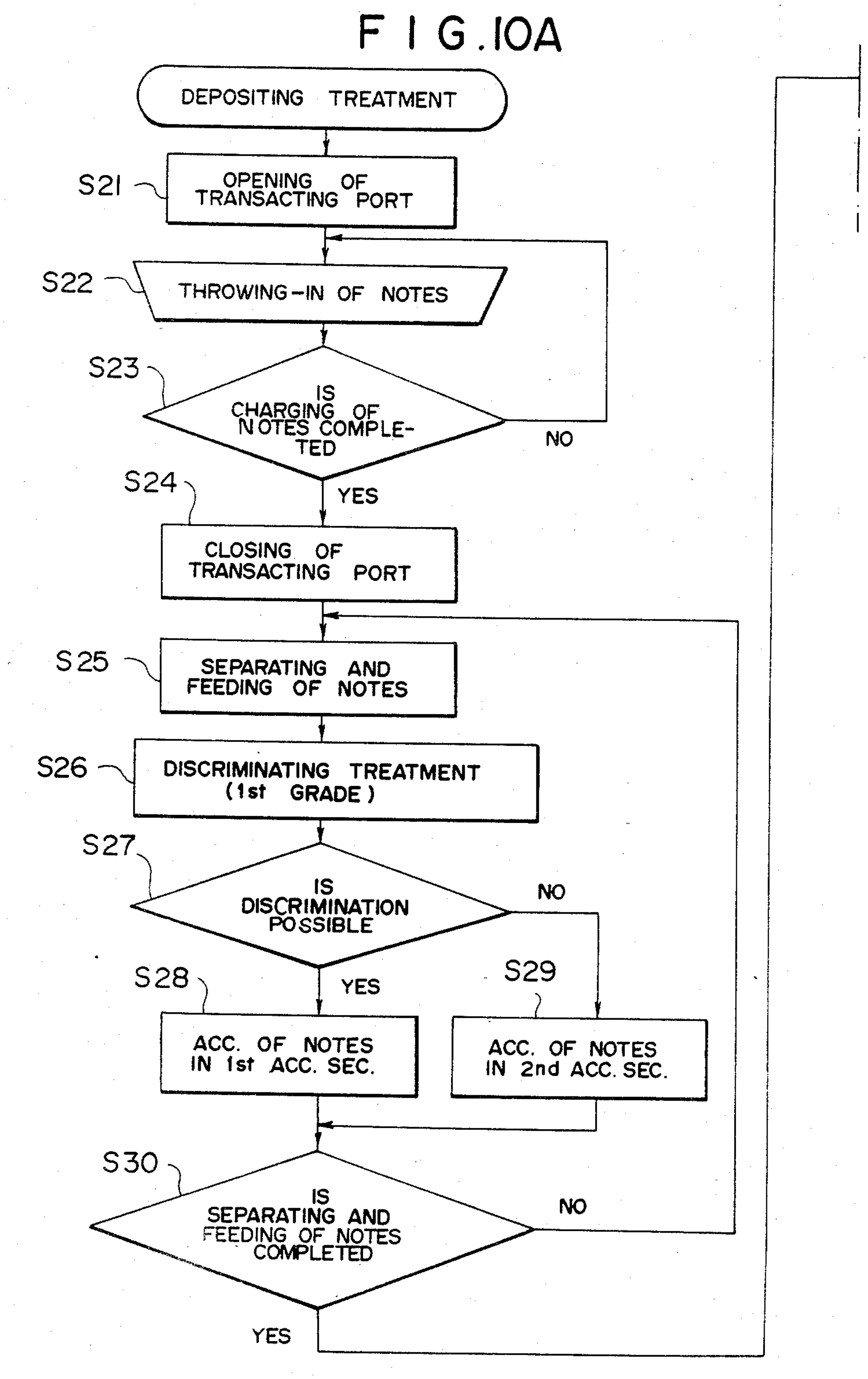
Figure 10B:
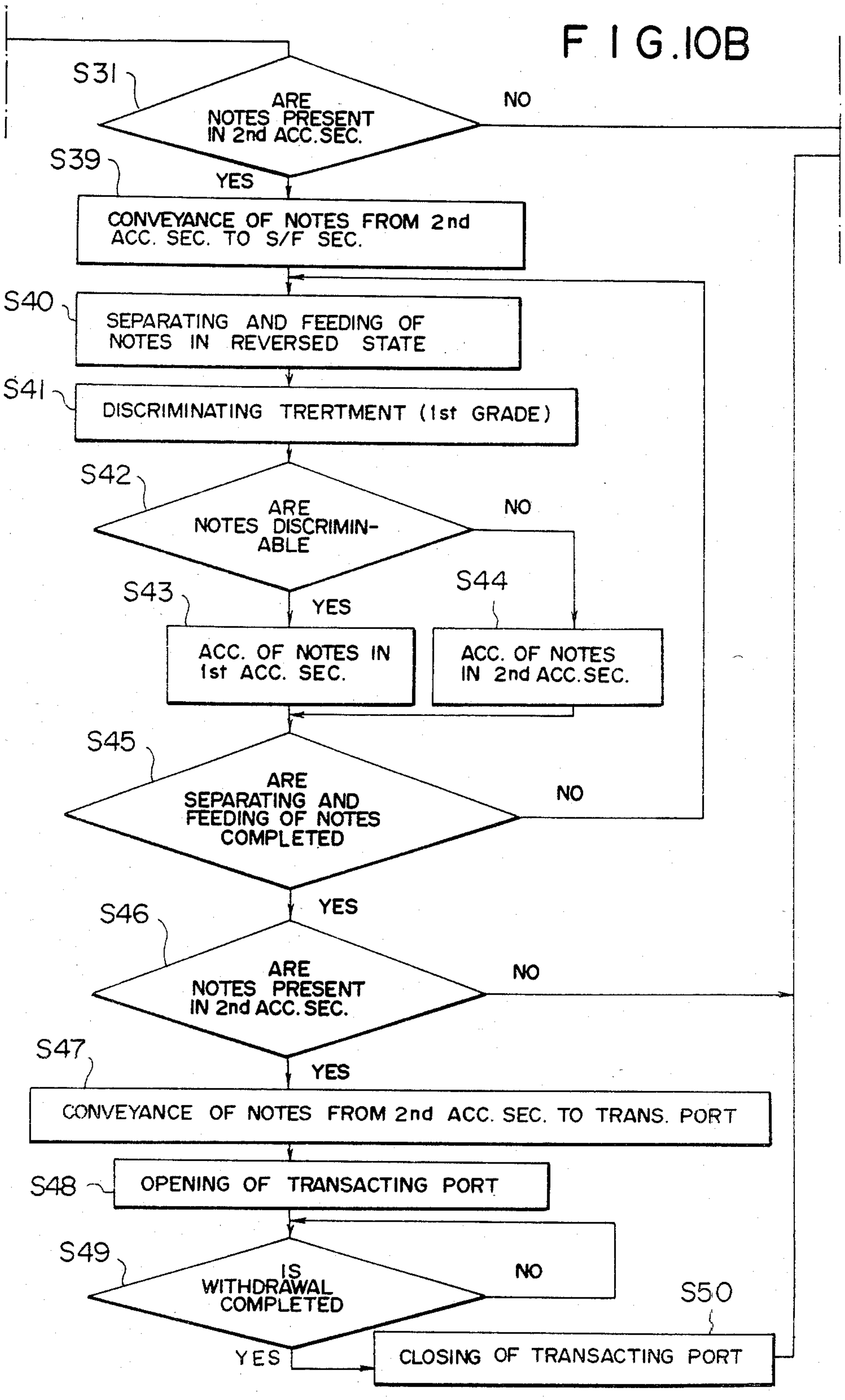
Figure 11B:
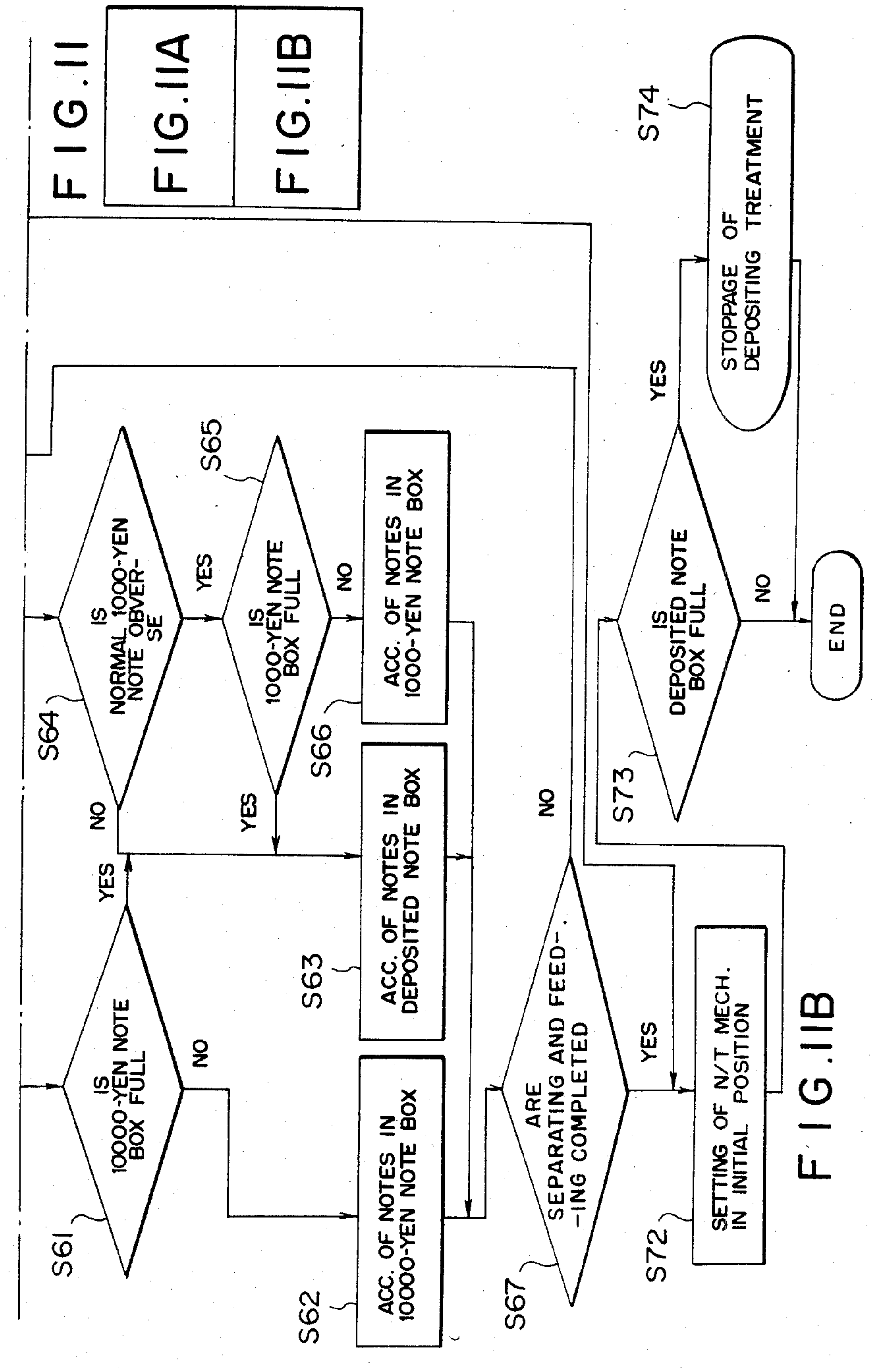
Figure 11A:
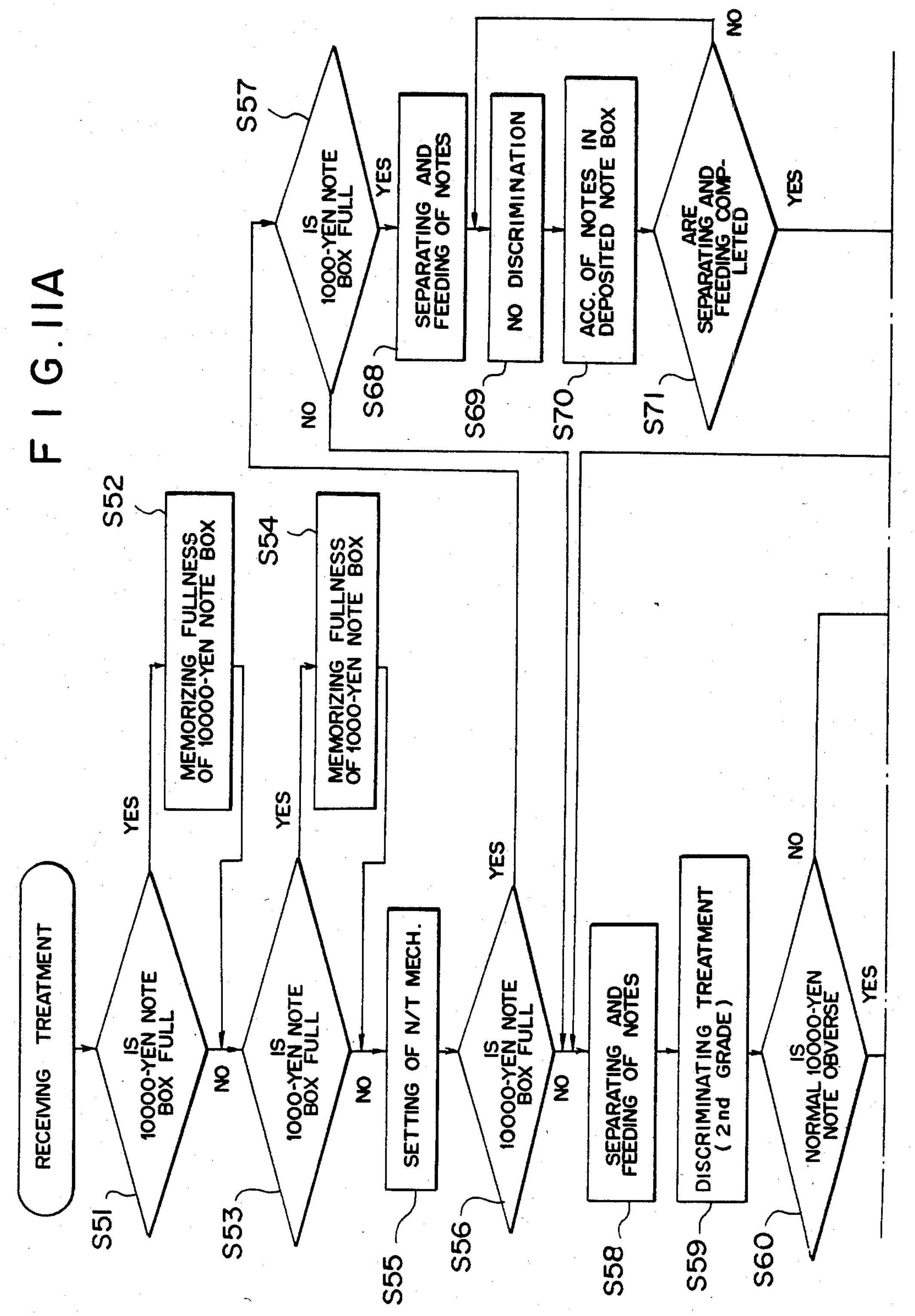

S7:

Treatments shown in FIGS. 10 and 11 are carried out in a manner described hereinafter.

S8:

Defrayal is requested by a customer.

Figures 12, 12B:
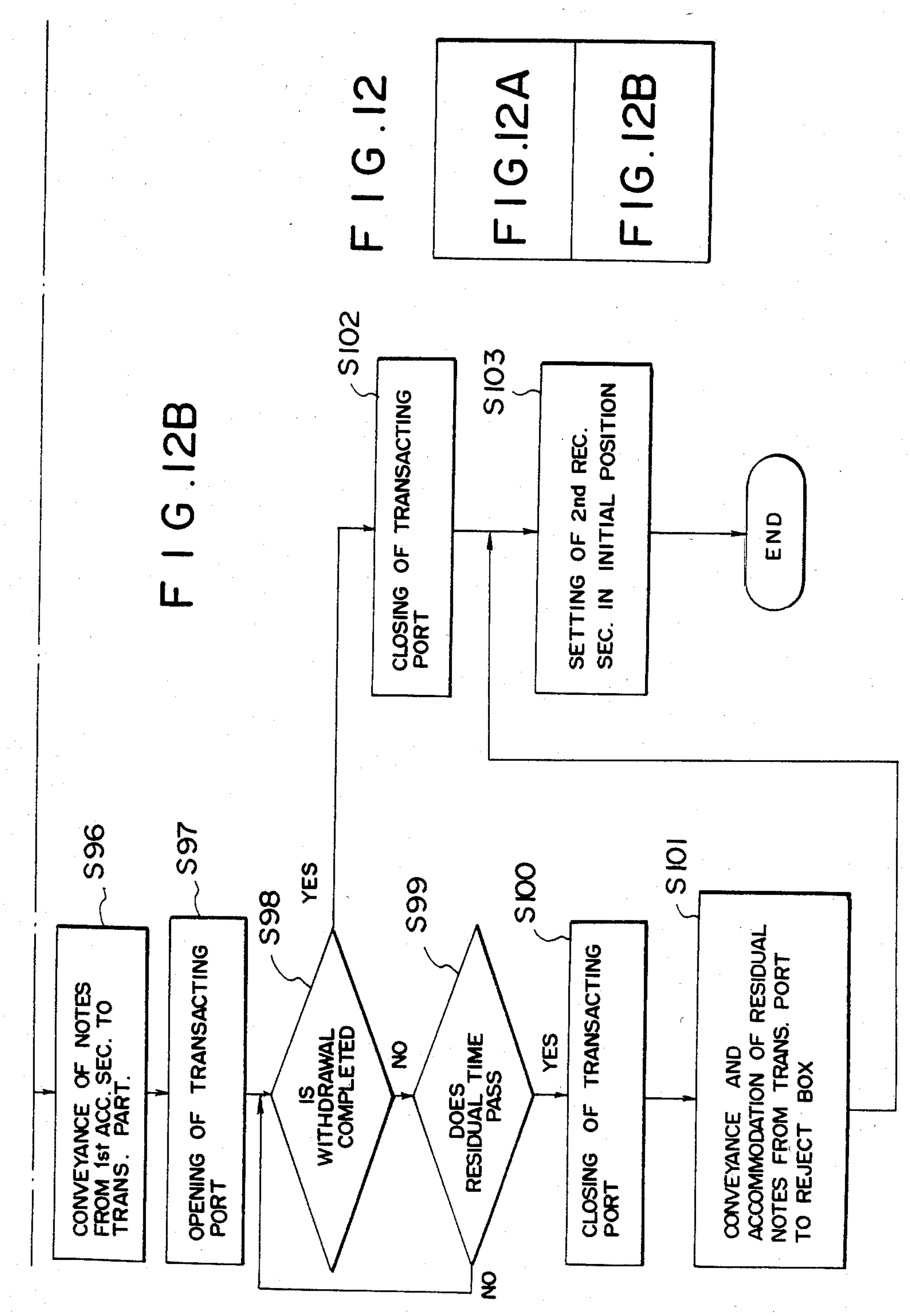
Figure 12A:
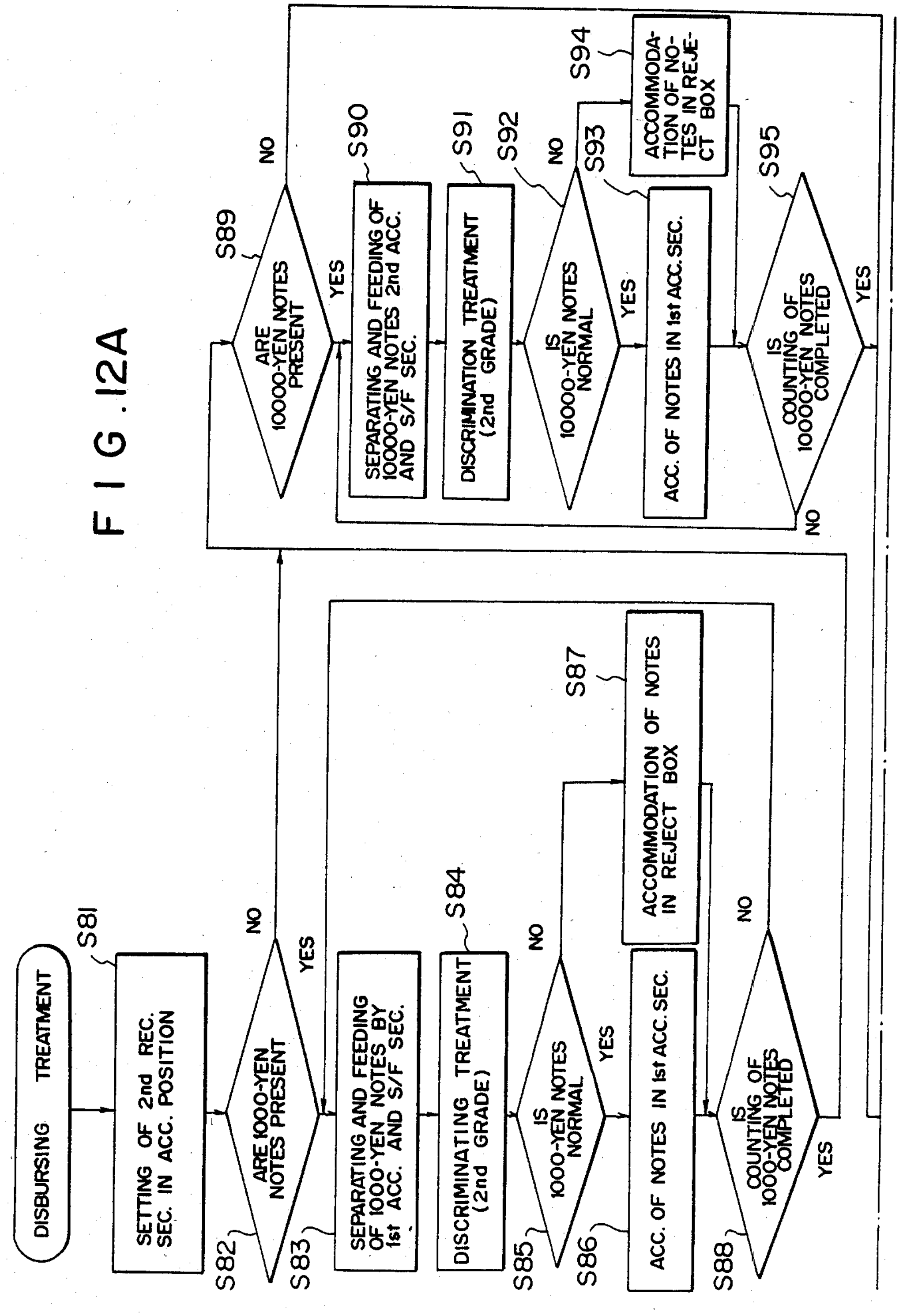

S9:

A treatment shown in FIG. 12 is carried out in a manner described hereinafter.

S10:

While the transaction is continued, the steps S6 through S9 are repeated.

S11:

When the bank is closed, transaction is terminated.

S12:

The depositing and disbursing mechanism is set at the initial position, the note boxes 4 through 7 are drawn out, notes are contained in a safe or the like, and the treatments are completed.

DEPOSITING TREATMENT

When a customer charges notes from a transacting port 2, treatments are carried out along the flow shown in FIG. 10 (or FIG. 11).

S21:

When the cutomer gives a depositing instruction by depressing a depositing button or the like, the transacting port 2 is opened.

S22:

When the customer throws notes into the transacting port 2, the lower ends of the notes are brought in abutting contact with a lower shutter *2a* and are retained in the state slantly piled along a guide *2b*.

S23:

Then, the customer gives an instruction of completion of charging.

S24:

The shutter of the transacting port 2 is closed.

S25:

The lower shutter *2a* is retreated, and the notes are guided in a separating feed section 45. The separating feed section 45 is actuated to separate the notes one by one and feed out the notes. In a running correcting section 46, slant delivery of the notes is corrected by belts 46 and the notes are fed into a discriminating section 47.

S26:

In the discriminating section 47, the notes fed one by one are achieved. The discriminating section has the following discriminating functions.

(a) A photo-pattern is discriminated by utilizing transmitted light.

(b) A photo-pattern is discriminated by utilizing reflected light.

(c) A magnetic pattern is discriminated by a magnetic head.

(d) Double feeding is detected by utilizing transmitted light.

(e) double feeding is detected by detecting the thickness by mechanical means.

(f) The note length is detected by utilizing signals formed by intermittent light rays.

(g) Slant feeding is detected by utilizing signals formed by intermittent light rays.

(h) Proximate feeding (abnormal approach of notes fed in succession) is detected by utilizing signals formed by intermittent light rays.

In the present embodiment, the discriminating functions (a) through (h) are called "discriminating functions of the first grade", and among the discriminating functions of the first grade, the functions (b) and (d) through (h) are called "discriminating function of the second grade".

The discriminating function (c) is to detect a minute difference of the characteristic among notes, and it is considered that the life of the member participating in this function is shorter than the lives of other members. Accordingly, the member for the discriminating function (c), which is readily worn away by checking of notes, is not actuated in the present embodiment while the discriminating operations of the second grade are performed. Since the front and back sides of a note cannot be discriminated by the function (a), the member performing the function (a) is not actuated at the time of discrimination of the low grade.

S27:

In the discriminating section 47, the discriminating operations of the first grade are carried out, and if the kind of notes or the like can be discriminated (the notes are normal), the operation of the step S28 is performed and if discrimination is impossible (the notes are abnormal notes), the operation of the step S29 is performed. More specifically, a distributing fork 48*a* of a first distributing section 48 is changed over, and notes are distributed into a first accumulating section 50 or second accumulating section 51 through a distributing fork 49*a* of a second distributing section 49.

S28:

Normal deposited notes are fed into vanes of an accumulating wheel 50*a* of the first accumulating section 50 and are accumulated on the accumulating wheel 50*a* by a gathering plate 50*b* in the state erected as shown in FIG. 1.

S29:

The note judged as being abnormal is accumulated by the accumulating wheel 51*a* and gathering plate 51*b* of the second accumulating section 51.

S30:

The presence or absence of notes is detected in the separating feed section 45, and when notes are left in the section 45, the operation of the steps S24 through S30 are repeated, and when all the notes are delivered out (the section 45 becomes empty) and the operations of the steps S25 through S29 are completed, the operation of the step S31 is carried out.

S31:

It is checked whether or not a note is present in the second accumulating section. In other words, it is checked whether or not an abnormal note is included in the deposited notes and is accumulated in the second accumulating section 51. In the case where all the notes are normal, the operation of the step 32 is carried out. In the case where an abnormal note is present, the flow is automatically shifted to the step S39.

S32:

The customer confirms the amount of money (in the discriminating section, the amount of money are added at every checking and the total amount is displayed in the vicinity of the transaction port 2, though the explanation is omitted).

S33:

The customer checks the displayed amount of money, and a permission of deposition is given by depressing a deposition button or the like.

S34:

The notes accumulated in the first accumulating section 50 are fed to the separating feed section 45 through the following operations. Namely, an opening and closing plate 51*c* mounted on a delivery passage laid out from the first accumulating section 50 to the second accumulating section 51 and the gathering plate 51*b* of the first accumulating section 51 are horizontally turned and the opening and closing guide *2c* of the transacting port 2 is opened as indicated by a chain line in FIG. 1, whereby the notes are moved to the transacting port 2 by the lower shutter *2a* and guide *2b*. Then, the opening and closing guide *2c* is closed and the lower shutter *2a* is opened, and the notes are fed to the separating feed section 45 and the receiving treatment (described hereinafter) is carried out along the flow shown in FIG. 11.

S35:

If the customer wishes return of notes and an instruction is given by depressing a return button or the like at the step S33, the notes are fed to the transacting port 2 as at the step S34.

S36:

The shutter of the transacting port 2 is opened, and the notes are returned.

S37:

Withdrawal of notes is checked by a sensor or the like arranged on the transacting port 2, and the transaction is completed.

S38:

The shutter of the transacting port 2 is closed, and the note returning treatment is completed.

S39:

When it is detected at the step S31 that abnormal notes are left in the second accumulating section 51, checking is conducted again by an abnormal note detection signal from the discriminating section 47. Incidentally, abnormal notes accumulated in the second accumulating section 51 are in the reversed state. Namely, if the notes are charged with the front face being on the front side, they are reversed so that the back face is on the front side. Cecking is conducted again in this reversed state, and as described above with respect to the step S34, the notes are delivered to the separating feed section 45 through the transacting port 2.

S40:

The reversed notes, discrimination for which is impossible, are separated one by one by the separating feed section 45 and fed into the discriminating section 47.

S41:

The discrimination of the first grade is carried out again by the above-mentioned discriminating functions (a) through (h).

S42:

The notes are sorted by changeover of the distributing forks 48*a* and 49*a* of the first and second distributing sections 48 and 49 according to whether discrimination is possible or impossible.

S43:

Normal notes are accumulated in the first accumulating section 50.

S44:

Abnormal notes are accumulated in the second accumulating section 51.

S45:

The presence or absence of notes is detected in the separating feed section 45, and completion of the separating feed operation is confirmed.

S46:

It is checked whether or not notes (abnormal notes) are accumulated in the second accumulating section 51, and if no abnormal note is accumulated in the section 51, the flow is returned to the step S32 and the treatment is carried out along the above-mentioned flow.

S47:

When notes are accumulated in the second accumulating section 51, the notes are delivered to the transacting port 2.

S48:

The transacting port 2 is opened and the notes are returned to the customer.

S50:

The transacting port 2 is closed, and the normal notes are treated in the above-mentioned manner along the step S32 and subsequent steps.

RECEIVING TREATMENT

All the notes are charged in the machine body 1 according to the instruction of the customer are normal. Then, the treatment of sorting these notes for utilizing them as notes to be defrayed is carried out.

S51:

If a depositing instruction is given (by depressing a deposition button by the customer), the fullness detecting sensor 44A detects whether or not the 10,000-yen note box 7 shown in FIGS. 1 and 2 is full.

S52:

If the box 7 is full, the fullness detection signal is stored.

S53:

It is checked whether or not the 1000-yen note box 6 is full.

S54:

If the box 6 is full, the fullness detection signal is stored.

Figure 3:
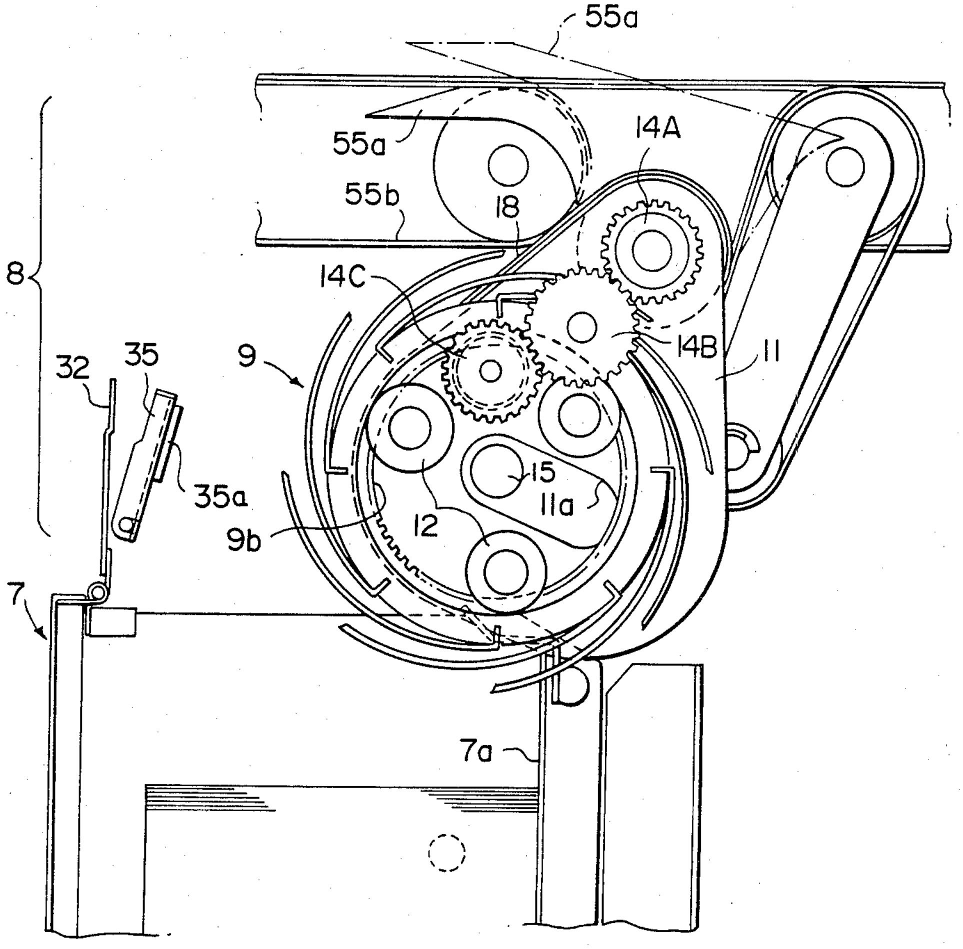
Figure 3:
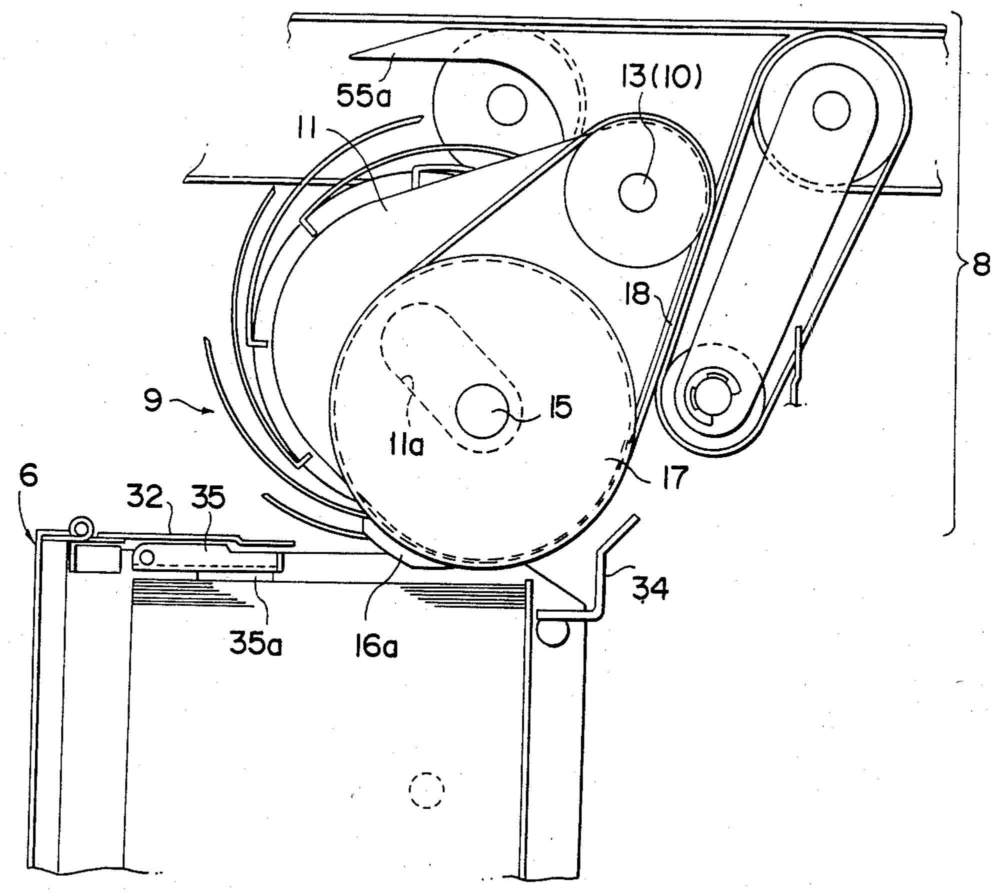
Figure 4:
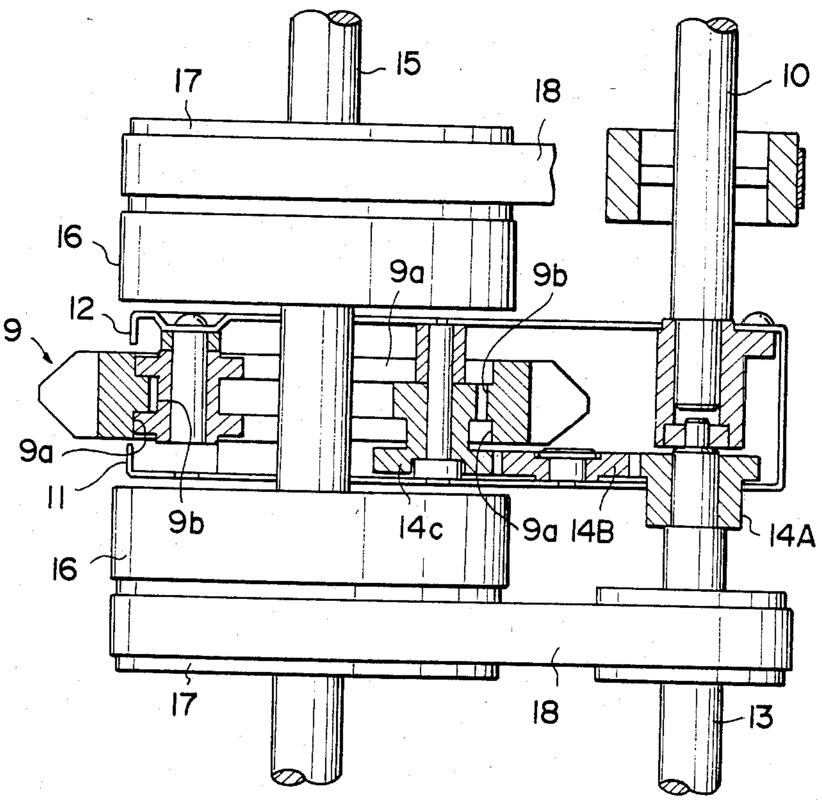
FIG. 4 is a cross-sectional view showing a main portion of the note transfer mechanism shown in FIG. 3, FIGS. 5A and 5B are side views for showing a structure of a stocker supporting device for supporting note boxes of the automatic money depositing and disbursing machine.

S55:

Then, the operation of bringing down the accumulating wheel 9 of the note transfer mechanism 8 from the position shown in FIG. 3-B (the above-mentioned initial position) to the position shown in FIG. 3-A is carried out. Simultaneously, the connecting drive shaft 43 shown in FIG. 8 is driven, and notes which have been raised up to the appropriate position are moved downward by a certain distance by the adjusting member 41, whereby a space for accumulation is formed as shown in FIG. 3-A. The pressing lid 32 and operation plate 35 are turned upward are retreated.

S56:

It is judged whether or not the 10000-yen note box 7 is full (the content memorized at the step 52 is checked).

S57:

If the 10,000-yen box 7 is full, it is judged whether or not the 1000-yen note box 6 is full (the content of the storage at the step 54 is checked).

S58:

If at the step S56 or S57 it is judged that at least one of the boxes 6 and 7 is not full, the notes to be allowed for deposition are separated by the separating feed section 45 and fed into the discriminating section 47.

S59:

The discrimination of the second grade mainly for discrimination of kinds of the notes is carried out in the discrimination section 47.

S60:

Among notes allowed for deposition, normal 10,000-yen notes with the front side up are detected, and in case of "YES", the program is shifted to the step S61 and in case of "NO", the program is shifted to the step S64. By the term "normal note" is meant a clean note which has no adhering tape and is not contaminated or damaged even partially and which is suitable as a note to be defrayed. Notes other than normal notes are called "damaged notes" and they are not used again.

S61:

It is judged whether or not normal 10,000-yen notes can be accommodated in the 10,000-yen note box 7, and if another 10,000-yen notes can be accommodated in the box 7 (the box 7 is not full), the operation of the step S62 is performed. If the box 7 is full, the operation of the step S63 is carried out.

S62:

In the case where notes can be accommodated in the box 7, normal 10,000-yen notes with the front side up are delivered from the discriminating section 47 to the second accumulating and separating feed section 8D of the note transfer mechanism 8 by changeover of the fork 48*a* of the first distributing section 48 through third, fourth, fifth and sixth distributing section 52, 53, 54 and 55. A fork 55*a* of the sixth distributing section 55 is changed over as indicated by a chain line in FIG. 3-A, and the notes are guided between belts 55*b* and 18 and fed in vanes of the accumulating wheel 9. By rotation of the accumulating wheel 9, the top ends of the notes are caused to fall into abutting contact with the side wall 7*a* of the 10,000-yen note box 7 and the notes are let to fall down in the box 7. At this time, the stopper 34 guides the top ends of the notes and prevents jumping of the notes after falling into the box 7. At this step for accommodating notes in the box 7, the pressing lid 32 and operation plate 35 are turned upward as shown in FIG. 3-A to form an opening in the upper portion of the 10,000-yen note box 7.

S63:

If the 10,000-yen note box 7 is full ("YES" at the step S61), even 10,000-yen notes with the front side up are let to fall into the deposited note box 4 from the discriminating section 47 by changeover of the fork 48*a* of the first distributing section 48 through the third distributing section 52 and first receiving section 8A.

S64:

Of the notes which are judged at the step S60 as being different from 10,000-yen notes with the front side up, 1000-yen notes with the front side up are detected, and in case of "NO", the notes are contained in the deposited note box 4 and in case of "YES", the operation of the step S65 is carried out.

S65:

It is checked whether or not the 1000-yen note box 6 is full, and if the box 6 is full, the operation of the step S63 is carried out and if another 1000-yen notes can be accommodated in the box 6, the operation of the step S66 is carried out.

S66:

In the case where another 1000-yen notes can be accommodated in the box 6, normal 1000-yen notes with the front side up are fed into the first accumulating and separating section 8C through the discriminating section 47, first distributing section 48, third distributing section 52 and fourth distributing section 53 by changing over the distributing fork 54*a* of the fifth distributing section 54 according to the procedure shown in FIG. 3-A, and they are let to fall down into the 1000-yen note box 6 from the accumulating wheel 9.

S67:

The operation of selecting normal 10,000-yen notes or 1000-yen notes with the front side up in the above-mentioned manner is repeated, and when any note allowed for deposition is left in the separating feed section 45 and there is not present any note in the separating feed section 45 and the note circulating delivery passage 3, the respective operations are completed.

Incidentally, notes received in the boxes 6 and 7 at the steps S62 and S66 are accumulated with the back side up.

S68:

If it is judged at the step S57 that the 1000-yen box 6 is full, since both the boxes 6 and 7 are full and notes allowed for deposition cannot be used again as notes to be defrayed, only the treatment of receiving notes allowed for deposition is performed. Notes are delivered out from the separating feed section 45.

S69:

The notes are passed through the discriminating section 47 without performing discrimination of the notes.

S70:

All the notes allowed for deposition are accommodated in succession in the box 4 through the first distributing section 48, third distributing section 52 and first receiving section 8A.

S71:

The operation of separating and feeding the notes allowed for deposition is thus completed.

S72:

The initial position of the note transfer mechanism 8 is set. At this operation of setting the initial position, as described hereinbefore, the accumulating wheel 9 of the note transfer mechanism 8 is turned upward and the pressing lid 32 is turned to the horizontal position as shown in FIG. 3-B to expose the friction member 35*a* of the operation plate 35 to the interior of the boxes 6 and 7. Furthermore, the adjusting member 41 is moved upward by the connecting drive shaft 43 shown in FIG. 8 and the top face of the note raised up by the urging force of the spring 39 is brought into contact with the friction member 35*a.* At this time, the position of the operation plate 35 is detected by the pressing force detecting sensor 36 and an adjustment is made so that the contact pressure between the friction member 35*a* and the note is kept constant. Since the normal note delivery operation is not carried out in the deposited note box 4 and reject box 5, attachment of the operation plate 35 and pressing force detecting sensor 36 can be omitted in the boxes 4 and 5.

S73:

Every time the treatment of receiving notes deposited at one time is carried out, it is judged whether or not the deposited note box 4 is full, and if the box 4 is not full, the note receiving operation can further be performed.

S74:

If fullness of the box 4 is detected by the fullness detecting sensor 44A, only the deposigint transaction is stopped because the deposited note box 4 is incapable of receiving another notes.

DISBURSING TREATMENT

When a customer wishes defrayal of notes from the transacting port 2, the amount of money to be defrayed or the desired kind of notes is confirmed and a disbursement button or the like is depressed. By this instruction, the disbursing (defrayal) treatment is performed according to the following steps. Defrayal of the desired amount of money is performed by using two kinds of notes, that is, 10,000-yen notes and 1000-yen notes.

S81:

At first, in the reject box 5, the pressing member 37 is pressed down to the lowermost position by the driving force of the connecting drive shaft 43 through the adjusting member 41 to increase the capacity of the reject box 5. This operation is called "setting of the accumulation position".

S82:

In the machine 1, it is checked whether or not 1000-yen notes are included in the desired kinds of notes or the total defrayal amount, and if 1000-yen notes are included, the operation of the step S83 is carried out and if 1000-yen notes are not to be defrayed, the operation of the step S89 is carried out.

S83:

In the case where 1000-yen notes are to be defrayed, the back faces of 1000-yen notes contained in the 1000-yen box 6 are drawn out one by one by the attracting drum 16 of the first accumulating and separating feed section 8C, and the 1000-yen notes are delivered into the note circulating delivery passage 3 by the feed belt 18 and fed into the discriminating section 47 through the sixth distributing section 55 and running correcting section 46.

S84:

The second grade discrimination of 1000-yen notes with the front side up is carried out in the discriminating section 47.

S85:

In the case where the notes are less damaged normal 1000-yen notes suitable for defrayal, the operation of the step S86 is carried out, and in the case where the notes are much damaged or double-fed 1000-yen notes not suitable for defrayal, the operation of the step S87 is carried out.

S86:

Normal 1000-yen notes are accumulated in the first accumulation section 50 through the first distributing section 48 and second distributing section 49. The 1000-yen notes are accumulated in the first accumulation section 50 with the front side up.

S87:

The 1000-yen notes not suitable for defrayal are fed into the second receiving section 8B from the first distributing section 48 through the third distributing section 52 and fourth discributing section 53. As described hereinbefore with respect to the step S81, the notes are let to fall down in the reject box 5 where the accumulation position has been set and are accumulated in the reject box 5.

S88:

A necessary number of normal 1000-yen notes are accumulated in succession below the first 1000-yen note by the operations of the steps S83 through S86, and completion of counting of the number of 1000-yen notes is confirmed and the operation of the step S89 is performed.

S89:

It is checked whether or not 10,000-yen notes are included in the notes to be defrayed, and if defrayal of 10,000-yen notes is not necessary, the operation of the step S96 is carried out.

S90:

When defrayal of 10,000-yen notes is necessary, the back faces of 10,000-yen notes contained in the 10,000-yen note box 7 are drawn out one by one by the attracting drum 16 of the second accumulating and separating feed zone 8D, and the notes are fed into the discriminating section 47 through the running correcting section 46.

S91:

In the discriminating section 47, the second grade discrimination of 1000-yen notes with the front side up is carried out.

S92:

If the notes are less damaged normal 10,000-yen notes suitable for defrayal, the operation of the step S93 is carried out, and if the notes are not suitable for defrayal, the operation of the step S94 is carried out.

S93:

Normal 10,000-yen notes are fed into the first accumulation section 50 as explained hereinbefore with respect to normal 1000-yen, and if 1000-yen notes are already accumulated, the 10,000-yen notes are accumulated in succession on the 1000-yen notes with the front side up.

S94:

The 10,000-yen notes not suitable for defrayal are let to fall down into the reject box 5 from the first distributing section 48 and accumulated in the reject box 5 as at the step S87.

S95:

The operations of the steps S90 through S93 are repeated, and when the necessary number of 10,000-yen notes are accumulated, completion of counting of the 10,000-yen notes is confirmed and the operation of the step S96 is carried out.

S96:

The 1000-yen and 10,000-yen notes accumulated in the first accumulating delivery section 50 are delivered to the transacting port 2 in the state where the 10,000-yen notes are piled on the 1000-yen notes and all the notes are placed with the front side up. More specifically, the gathering plate **51*b* and the opening and closing plate 51*c* are placed at the horizontal posture, and the lower shutter 2*a* is closed as indicated by a solid line in FIG. 1 and the opening and closing guide 2*c* is retreated upward as indicated by a chain line in FIG. 1. In this state, the lower shutter 2*a* is communicated with the transacting port 2. According to the method proposed by the applicant in Patent Application No. 122642/80, the lower delivery belt 56 is placed at the horizontal posture and the upper delivery belt 57 is placed at the horizontal posture in parallel to the lower delivery belt 56, and the accumulated 1000-yen notes and 10,000-yen notes are delivered to the guide 2*b* of the transacting port 2 in the state gripped between both the belts 56 and 57 and the respective notes are supported on the lower shutter 2*a* and guide 2*b*** with the front side up.

S97:

The transacting port 2 is opened.

S98:

When all the defrayed notes are taken away by the customer, this act is confirmed by the detection sensor arranged in the vicinity of the transacting port 2 and in case of "YES", the transaction with the customer is completed and the operation of the step S102 is carried out.

S99:

When the detection sensor detects all or parts of the notes, the timer is started and a certain time is allowed to pass, and when the customer takes away the notes during this time, the flow is returned to the step S98 and the transaction is completed.

S100:

If a certain time has passed without the notes being taken away by the dustomer, the shutter of the transacting port 2 is closed.

S101:

The lower shutter **2*a* of the transacting port 2 is opened, and the amount of residual notes in the separating feed section 45, running correcting zone 46 and discriminating section 47 (arranged to perform the second grade discrimination) is checked and the notes are discharged into the reject box 5 through the first distributing section 48, third distributing section 52, fourth distributing section 53 and second receiving section 8B. A record of the customer forgetting the notes is made and used as a service material for informing the customer of non-receipt from the bank. Then, the operation of the step 103** is carried out.

S102:

When the transaction is completed at the step S98, the transacting port 2 is closed.

S103:

The second receiving section 8B is set at the initial position (refer to the steps S2 and S72), and the operation of the machine body 1 is stopped.

According to the instruction of a customer, the flow is returned to the step S21 shown in FIG. 10 or the step S81 shown in FIG. 12, and the operations are performed according to the above-mentioned flow.

The foregoing illustration is made with reference to the case where one transacting port 2 is formed. Another transacting port 2 as shown on the right side of FIG. 1 may be arranged on the left side symmetrically.

As will be apparent from the foregoing description, according to the present invention, there is provided a note transfer mechanism for an automatic money depositing and disbursing machine where notes are thrown into a transacting port are fed into a discriminating section to detect the presence or absence of abnormal notes and receive normal notes and at least portions of the received notes are used as notes to be defrayed. The note transfer mechanism being disposed below a note circulating delivery passage for delivering received and defrayed notes through a common route and above a stacker supporting device supporting a plurality of boxes for containing notes therein in such a manner that the boxes can be drawn out at least in the horizontal opposite directions.

According to the present invention, optional number of boxes can be set and optional boxes can be independently used for both the deposit and defrayal of notes. Furthermore, since the boxes can be removed out at least in two directions, the place and condition for installation of the machine are easily varied and the machine can be instructed to be compact.

What is claimed is:

1. An automatic money depositing and disbursing machine wherein notes inserted into a transacting port are fed into a discriminating section to detect the presence or absence of abnormal notes and to receive normal notes and wherein at least a portion of the received notes are used as notes to be disbursed, which machine comprises: a housing for containing the several elements of the machine, note circulating delivery passage means for delivering along a common route received notes and notes to be disbursed, note transfer means disposed below said note circulating delivery passage for transferring notes between said note delivery passage and at least one box for containing notes therein, a plurality of boxes for containing notes therein and movably positioned below and adjacent said note transfer means, and stacker supporting means disposed below said note transfer means for movably supporting said plurality of boxes, said note transfer means including means for receiving notes from the note circulating delivery passage means, and note removing means to suck notes from the boxes supported on the stacker supporting means so as to transfer the notes to the note circulating delivery passage means, said stacker supporting means including a stationary rail portion attached to the bottom of the housing and a movable portion adapted to carry the boxes thereon, said movable portion slidably supported on the stationary rail portion for movement in horizontal opposite directions to permit removal of the boxes from the housing and to permit insertion of the boxes into the housing in either horizontal direction, and pivot means provided on said movable portion for vertically raising the boxes relative to the movable portion and toward the means for receiving notes and the note removing means of the note transfer means to permit notes to be transferred to and removed from said boxes by said note transfer means, and for vertically lowering the boxes away from the means for receiving notes and note removing means of the note transfer means to permit the boxes to be horizontally slidably removed from the housing without contacting the note transfer means.

2. A machine according to claim 1 wherein said stacker supporting device further comprises means for locating said boxes in the movable portion.

3. A machine according to claim 1 wherein said movable portion includes outer side plates carried on said rail portion and inner side plates provided inside said outer side plates and vertically movable relative thereto.

* * * * *